United States Patent
Lütz et al.

(10) Patent No.: US 12,162,232 B2
(45) Date of Patent: Dec. 10, 2024

(54) METHOD AND DEVICE FOR APPLYING A MATERIAL TO A SUPPORT

(71) Applicant: Carl Zeiss Jena GmbH, Jena (DE)

(72) Inventors: Andreas Lütz, Dornburg-Camburg (DE); Alexander Pesch, Jena (DE); Daniel Thomae, Jena (DE); Mirko Riethmüller, Leipzig (DE)

(73) Assignee: Carl Zeiss Jena GmbH, Jena (DE)

( * ) Notice: Subject to any disclaimer, the term of this patent is extended or adjusted under 35 U.S.C. 154(b) by 405 days.

(21) Appl. No.: 17/438,294

(22) PCT Filed: Mar. 12, 2020

(86) PCT No.: PCT/EP2020/056624
§ 371 (c)(1),
(2) Date: Sep. 10, 2021

(87) PCT Pub. No.: WO2020/182934
PCT Pub. Date: Sep. 17, 2020

(65) Prior Publication Data
US 2022/0184909 A1   Jun. 16, 2022

(30) Foreign Application Priority Data
Mar. 14, 2019   (DE) .............. 10 2019 106 505.4

(51) Int. Cl.
B29D 11/00   (2006.01)

(52) U.S. Cl.
CPC .... B29D 11/0073 (2013.01); B29D 11/00326 (2013.01); B29D 11/00432 (2013.01)

(58) Field of Classification Search
CPC .......... B29D 11/0073; B29D 11/00326; B29D 11/00432
See application file for complete search history.

(56) References Cited

U.S. PATENT DOCUMENTS

| | | | |
|---|---|---|---|
| 5,000,805 A * | 3/1991 | Lowe | B29C 66/1122 156/155 |
| 5,679,197 A * | 10/1997 | Haupt | B29C 63/025 297/DIG. 2 |
| 5,720,847 A | 2/1998 | Nagate et al. | |
| 2012/0013980 A1 | 1/2012 | Begon | |
| 2021/0013980 A1 | 1/2021 | Nagarathinam | |

FOREIGN PATENT DOCUMENTS

| | | |
|---|---|---|
| CN | 203854095 U | 10/2014 |
| EP | 0 227 202 A2 | 7/1987 |
| EP | 0 721 837 A1 | 7/1996 |
| JP | 6416351 B1 | 10/2018 |

(Continued)

OTHER PUBLICATIONS

Machine translation of JP 6146351 B1, Inventor: Nakamura Yoshihiro, Publication date: Oct. 13, 2018.*

(Continued)

*Primary Examiner* — Vishal I Patel
(74) *Attorney, Agent, or Firm* — Fish & Richardson P.C.

(57) ABSTRACT

Methods and apparatuses for mounting a material (1) on a carrier (6) are provided. To this end, the material is arranged on a porous layer (2) of an air bearing arrangement (2, 3).

23 Claims, 9 Drawing Sheets

(56) References Cited

FOREIGN PATENT DOCUMENTS

WO        WO 00 /21734 A1    4/2000
WO     WO 2009/021793 A1    2/2009

OTHER PUBLICATIONS

Chinese office action, with summary translation, for corresponding CN Appl No. 202080020915.2, dated Jan. 18, 2023.
Chinese Office Action, with summary translation, for corresponding CN Appl No. 202080020915.2, dated Jun. 3, 2023.
Translation of International Search Report for corresponding PCT Appl No. PCT/EP2020/056624, dated Jun. 22, 2020.

* cited by examiner

METHOD AND DEVICE FOR APPLYING A MATERIAL TO A SUPPORT

This application is a national stage of and claims priority under 35 U.S.C. § 371 to PCT Application No. PCT/EP2020/056624, filed on Mar. 12, 2020, which claims priority to German Application No. 10 2019 106 505.4, filed on Mar. 14, 2019. The contents of both of these priority applications are hereby incorporated by reference in their entirety.

The present application relates to methods and apparatuses for mounting a material on a carrier, in particular for mounting a photosensitive material, in which optical structures, such as holograms and gratings, can be written, on a carrier.

For various applications in optics, a material, for example a film, has to be mounted on a transparent carrier. One example are films made of a photosensitive material in which holographic structures have been written. These films are then mounted on transparent carriers. Such transparent carriers may be spectacle lenses, for example, and the holographic structures are used for data overlay. In other such applications, carriers may be windshields for motor vehicles. Here, too, the holographic structures can be used for example for data overlay. In other applications, use is made of reflective carriers, for example parabolic mirrors, or non-transparent carriers, such as for example fittings in a motor vehicle.

In such cases, the film must often be mounted on a curved surface of the carrier. As a rule, however, films can be curved only in one direction without any problems, such that only a cylindrical shape or a conical shape are possible in a kink-free manner without any problems.

It is therefore an object of the present invention to provide methods and apparatuses which make it easier to mount a material on a carrier, in particular even in the case of curved surfaces of the carrier.

A method as claimed in claim 1 and an apparatus as claimed in claim 17 are provided. The dependent claims define further embodiments.

According to one embodiment, a method for mounting a material on a carrier is provided, comprising:

placing the material on a surface of a porous layer of an air bearing arrangement, wherein the surface of the porous layer is designed to be complementary to a surface of the carrier on which the material is to be mounted, and arranging the carrier on the material arranged on the surface of the porous layer, wherein the method further comprises:

applying negative pressure to the air bearing arrangement in order to suction the material, before the carrier is arranged on the material, and/or applying overpressure to the air bearing arrangement in order to release the carrier with the material mounted thereon from the air bearing arrangement.

By using an air bearing having a shape that is complementary to the carrier (that is to say essentially a negative shape), it is possible to bring the material to be mounted into a suitable shape and/or to make detachment of the carrier with the material mounted thereto easier. As a result of the use of the porous material, an exact adaptation to the shape of the carrier is possible while at the same time providing a multiplicity of air outlets.

The air bearing may be of full-aperture configuration in relation to the carrier, such that a surface of the air bearing is at least as large as a surface of the carrier on which the material is mounted, or else may be of only partial or sub-aperture configuration, whereby for example the material is mounted only on part of the surface of the carrier.

As a result of the application of overpressure, detachment of the carrier with the material mounted thereon can be made easier.

It should be noted that the term "air bearing" here is to be understood in a general sense and includes the use of gases other than air. For example, inert gases can be used in some embodiments or specially purified gases can be used if this is necessary or helpful for a respective application.

The material may comprise a film. The method may then also comprise applying an adhesive to the film before the carrier is arranged on the material.

In this case, films are generally to be understood as being thin materials that are bendable and that can thus be brought to the appropriate shape by means of the method illustrated. Such films may be made of plastic, but can also be other thin substrate materials, such as thin glass substrates.

The term "film" also includes the use of film stacks or of stacks of several already connected films with possibly different functions.

Alternatively, the material may also comprise a liquid material.

In this case, the method may comprise closing an air connection of the air bearing arrangement when placing the material on the surface of the porous layer and when arranging the carrier. In this way, penetration of the material into the porous layer can be reduced.

The method may further comprise a heat treatment of the material placed on the surface of the porous layer.

The heat treatment can improve the adaptation of the material to the shape of the air bearing and thus to the shape of the carrier.

The method may further comprise treating the material, for example exposure to produce a holographic structure and/or grating structure, engraving or laser treatment.

For example holographic structures can be formed in the material by the exposure or other machining. By virtue of the fact that this is done after the material has been brought into the appropriate shape by the air bearing, it can be ensured that the exposure matches the final shape of the material on the carrier.

The material may be mounted on the surface of the porous layer during the treatment.

Alternatively, during the treatment, the material may be connected to the carrier and be removed from the porous layer.

The method may further comprise removing excess material from the carrier.

The method may further comprise mounting a further carrier on the material on a side facing away from the carrier, such that optical components can be produced with embedded material.

The carrier may be a transparent carrier, for example made of glass, transparent plastic or another material that is customary in the production of optical components.

The material may comprise an optical material or an optical element. Examples include transparent materials or materials with optical structures, for example films with diffractive or refractive structures, for example holograms.

The method may thus be used to produce an optical component.

The carrier and/or the material may comprise a glass plate.

The method can further comprise:

placing the carrier on a surface of a further porous layer of a further air bearing arrangement, wherein the surface of the further porous layer is designed to correspond to a desired surface of the carrier on which the material is to be mounted, and applying negative pressure to the further air bearing arrangement in order to suction the carrier, before the carrier is arranged on the material.

In this way, the carrier can also be brought into a desired shape, which can be used, for example, to connect two glass plates.

According to another embodiment, an apparatus for fastening a material to a carrier is provided, comprising:

an air bearing arrangement having a porous layer arranged on an air bearing, wherein the porous layer has a surface for receiving the material, and a pump for applying overpressure and/or negative pressure to the air bearing.

The surface of the porous layer may have a curved shape. The curvature can in this case be present in one or more spatial directions (one-dimensional or multi-dimensional curvature). The curvature can be rotationally symmetrical, but can also be present as a so-called free form.

The apparatus may further comprise a heating device which is arranged for heating a material mounted on the surface of the porous layer.

The apparatus may further comprise a holder for holding the material at an edge of the surface of the porous material.

The apparatus may further comprise a cutting device for removing excess material from the carrier.

The surface of the porous layer may have a coating in order to modify the properties of the porous layer.

In this case, the coating may have openings with a diameter which is smaller than an average diameter of pores in the surface of the porous layer. In this way, a desired size of air inlets/outlets can be set.

The surface of the porous layer may have a deviation from a desired shape, corresponding to the surface of the carrier, of less than 100 μm, preferably less than 50 μm, for example 100 μm or less. This enables the manufacture of optical components that require a high level of precision.

The apparatus may further comprise:

a further air bearing arrangement having a further porous layer arranged on a further air bearing, wherein the further porous layer has a surface for receiving the carrier (50). In this way, a desired shape of the carrier can be ensured in the case of flexible or formable carriers.

The apparatus may be set up to carry out one of the methods described above.

The invention will be explained in more detail below on the basis of embodiments with reference to the attached drawings. In the drawings.

Embodiments will now be explained in detail. These embodiments relate to the mounting of a material on a carrier, in particular a transparent carrier with a curved surface. First, one embodiment is explained in which the material is in the form of a film. Variations of this embodiment in which the material can also be in liquid form will be explained later.

Figure 1:
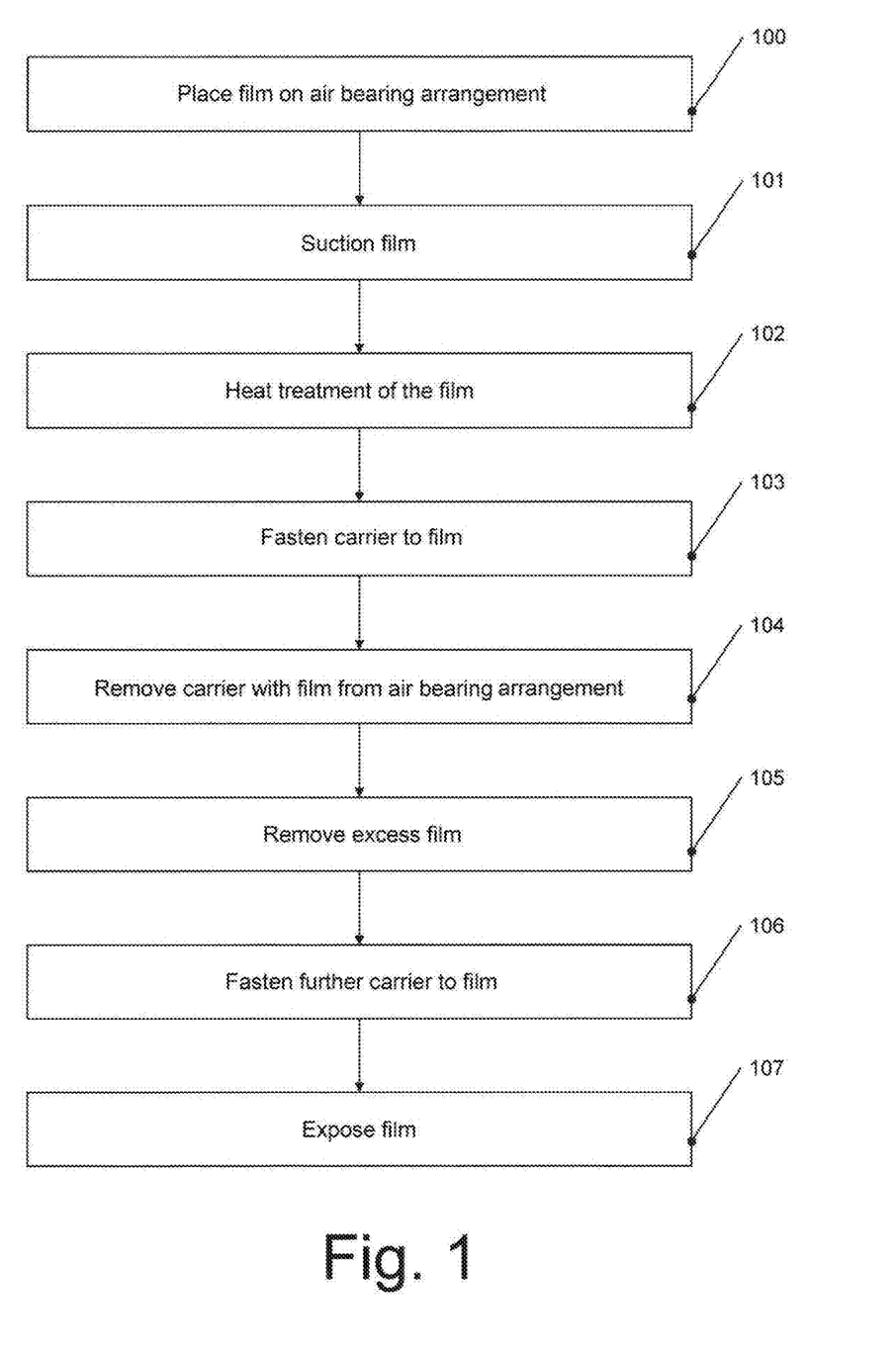
FIG. 1 shows a flow diagram for illustration of a method according to one embodiment.

FIG. 1 shows a flow diagram for illustration of a method according to one embodiment. It should be noted that some of the method steps illustrated can also be omitted, that is to say are optional. In addition, not all method steps necessarily have to be carried out in the order illustrated. Some of these variations and modifications of the method of FIG. 1 will also be explained in more detail later with reference to FIGS. 4A, 4B and 5.

An apparatus according to one embodiment is used to carry out the method. The use of such an apparatus for carrying out the method of FIG. 1 and the apparatus itself will be explained with reference to FIGS. 2A to 2F.

Figure 2A:
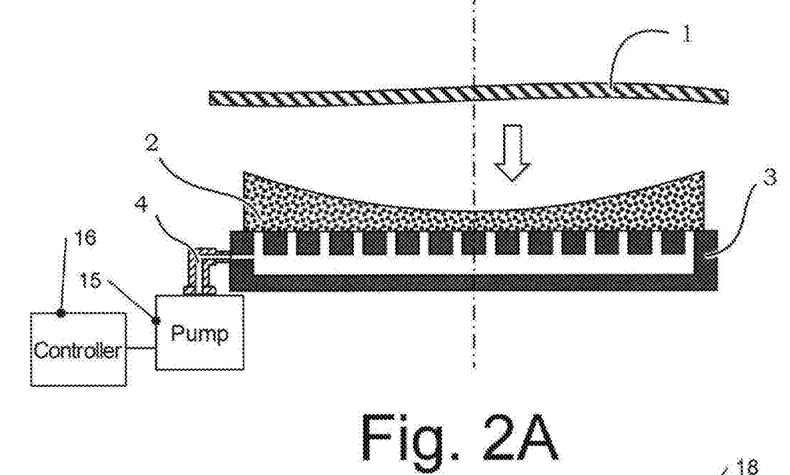
FIGS. 2A to 2F show illustrations of various method steps of FIG. 1 using an apparatus according to the invention.

In step 100 of the method, a film is placed on an air bearing arrangement of an apparatus according to one embodiment. This is illustrated in FIG. 2A. FIG. 2A shows in this case a cross-sectional view of a film 1 which is arranged on the apparatus according to the invention. In this case, the air bearing arrangement of the apparatus comprises an air bearing 3, which comprises a housing, on one side of which air inlets/outlets are arranged, and a porous layer 2 which is arranged thereon and which is made of a porous material. The porous material may comprise for example porous graphite, a porous sintered ceramic and/or sintered brass. Such a porous material can be used to achieve a very high density of air outlets/inlets on a surface of the porous layer 2, said surface facing away from the air bearing 3. In this case, the film 1 can in particular be stretched over an edge of the layer 2.

The surface of the porous layer 2 facing away from the air bearing 3 (hereinafter simply referred to as the surface of the layer 2) has a surface shape which is complementary to a surface shape of a carrier on which the film 1 is to be mounted, that is to say a negative of the surface shape of the carrier. This will become more apparent from later figures. The surface shape of the layer 2 can be produced by means of ultra-precision machining, whereby shape deviations of only a few micrometers are achieved (for example shape deviations of less than 100 μm, less than 50 μm or less than 10 μm). This may include a turning, milling or grinding process, or else other manufacturing processes such as laser machining.

Figure 5:
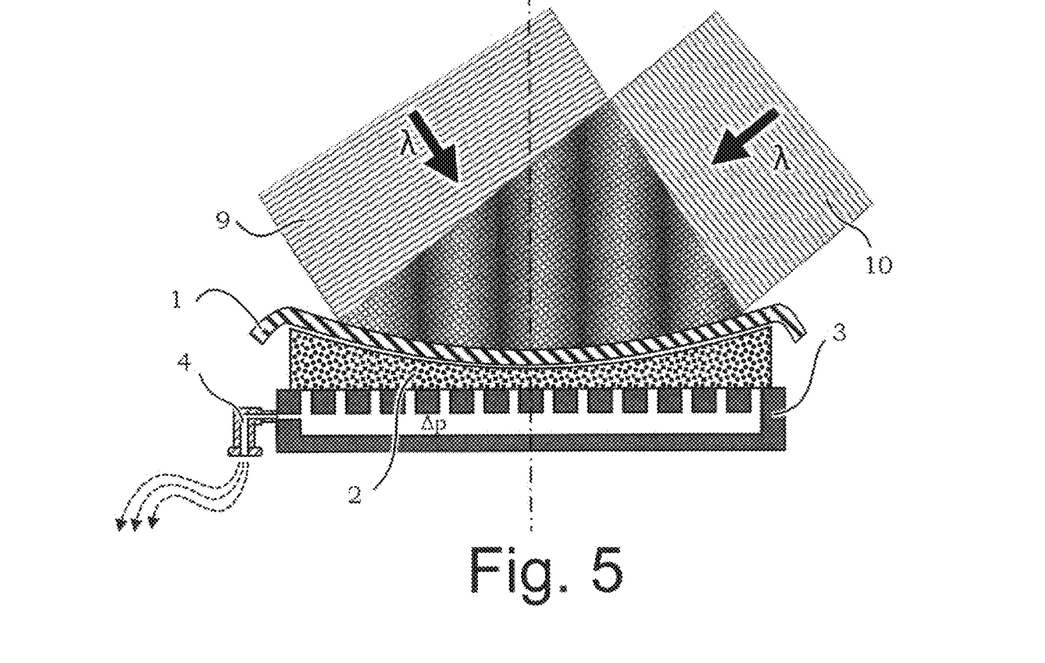
FIG. 5 shows a cross-sectional view of an apparatus according to one embodiment in the case of a variation of the method of FIG. 1.

If the layer 2 is to have an optical function (for example reflection during an exposure, as will be shown later in FIG. 5), the layer 2 may be polished depending on the material used.

Figure 6:
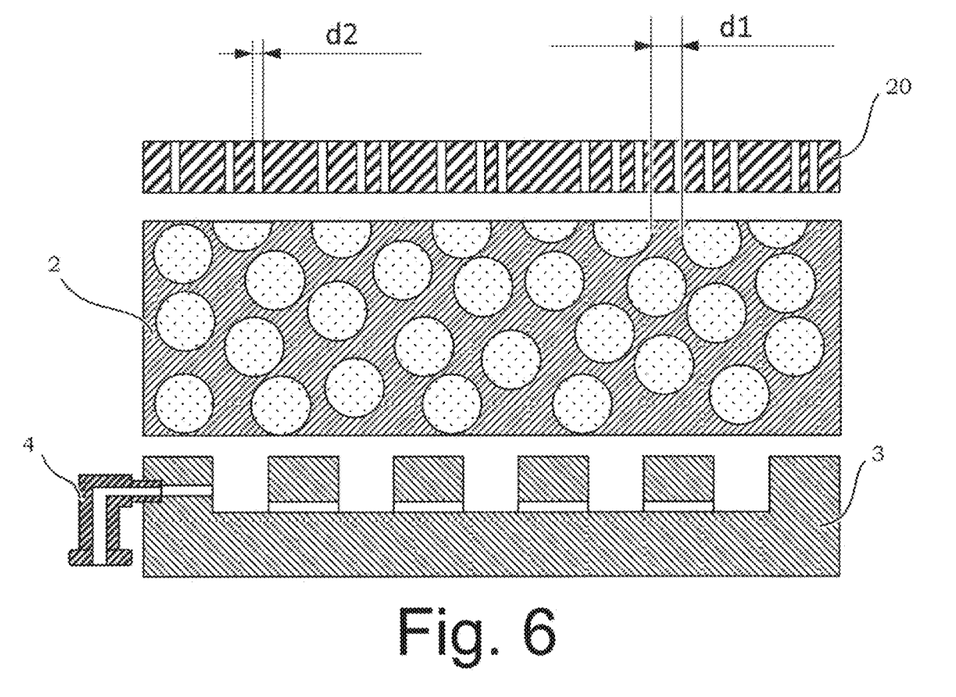
FIG. 6 shows a cross-sectional view of an apparatus according to a further embodiment.

In some embodiments, the surface of the layer 2 may have an additional coating which, depending on the design, fulfills certain functions. A corresponding embodiment is illustrated in FIG. 6, in which a coating 20 is arranged on that surface of the porous layer 2 on which the film 1 is placed.

For example, such a coating may restrict the air flow through the layer 2 or counteract the penetration of liquids, for example in the case of a hydrophobic coating. Finishing of the surface of the layer 2 is also possible by means of such a coating.

A microstructured or nanostructured coating may also be used in order to obtain nozzle cross sections in the submicrometer range and to minimize unevennesses of the porous layer 2 or to modify the properties of the porous layer 2 in another way. As an example, the layer 20 of FIG. 6 has openings with a diameter d2 which is smaller than an average diameter d1 of pores in the surface of the layer 2. For example, d1 can be about 13 µm, while d1 can be about 1 µm.

In order to produce such a layer, the layer 20 can be applied for example as a silicon layer to the layer 2 and then structured using conventional lithography methods. For example, a photoresist can be applied to the layer 20 and exposed and developed correspondingly to the openings to be produced, followed by etching of the silicon and removal of the rest of the photoresist.

The air bearing 3 has an air inlet/outlet 4 which is connected to a pump 15. In the embodiment of FIG. 2A, the pump 15 is a suction pump which can generate a negative pressure in the air bearing 3 and can thus draw in air through pores of the layer 2. The pump 15 can be reversible, that is to say can also operate as a pressure pump in some embodiments. In yet other embodiments, it is also possible for only a pressure pump to be provided. The pump 15 is controlled by a controller 16.

Figure 2B:
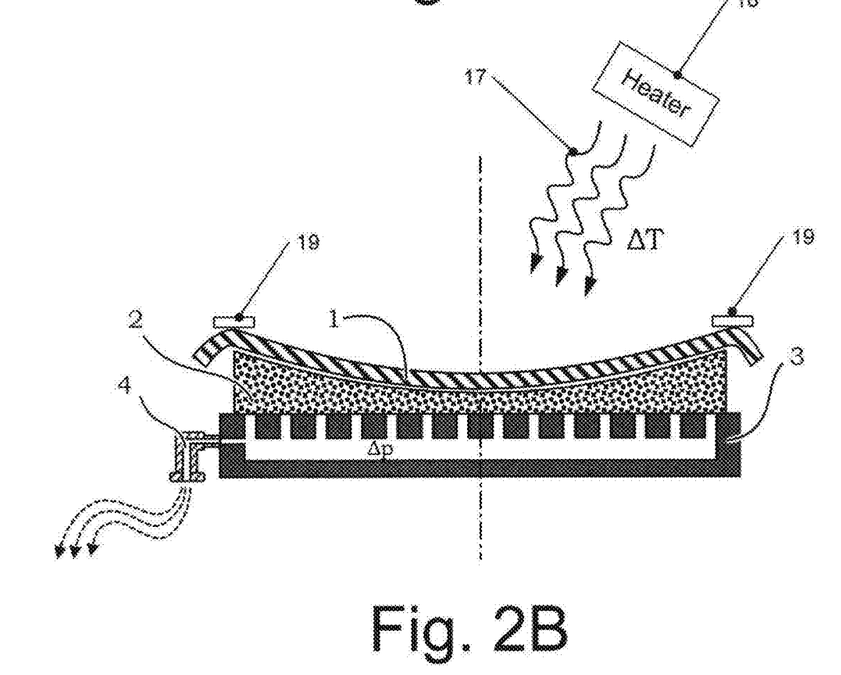

In step 101, the film is then suctioned onto the air bearing arrangement by applying negative pressure to the air bearing 3, and in step 102 a heat treatment of the film is optionally carried out. This is illustrated in FIG. 2B. For the suction of the film 1, a negative pressure Δp is generated in the air bearing 3 by means of the pump 15, as a result of which the film 1 is suctioned onto the surface of the layer 2. Optionally, a holder, such as a ring 19 in FIG. 2B, can fix the film in this case at the edges of the layer 2. Depending on the film, the surface of the layer 2 may be multi-dimensionally curved to a certain extent, which is predetermined by the material and the adaptability of the film, for example in a spherical shape, a rotationally symmetrical, aspherical shape or a free form. In principle, a planar shape is also possible, the advantages of using the air bearing arrangement coming into effect particularly in the case of curved shapes. It should be noted that curvatures of the layer 2 can be positive or negative, that is to say concave or convex, that is to say can adapt to different shapes of the carrier. In this case, concave radii of curvature can be in the range of 60 mm and more, but are not limited thereto.

The negative pressure when the film is being suctioned can be selected depending on the radius of curvature of the surface of the layer 2 and/or on the stiffness of the film 1.

A heat treatment can in this case reduce stresses in the film 1 and improve the adaptation of the film 1 to the shape of the surface of the layer 2, if necessary. For this purpose, a heater 18, for example an infrared lamp or an arrangement of several infrared lamps, can be provided, which emits thermal radiation 17 onto the film 1. Other types of heaters, for example hot air blowers, can also be used depending on the type of film 1. Such a supply of heat is advantageous, particularly in the case of smaller radii of curvature of the surface of the layer 2, when there might otherwise be greater stresses in the film 1 during suction.

In some embodiments, the shape of the film 1 can be adapted incrementally via several air bearing arrangements with increasingly great curvature, wherein the surface of the layer 2 of the last air bearing arrangement used is then adapted to the shape of the carrier in this case. Here, no clamping between two tool halves is necessary to shape the film.

In step 103, a carrier is then fastened to the film. This is illustrated in FIG. 2C.

Figure 2C:
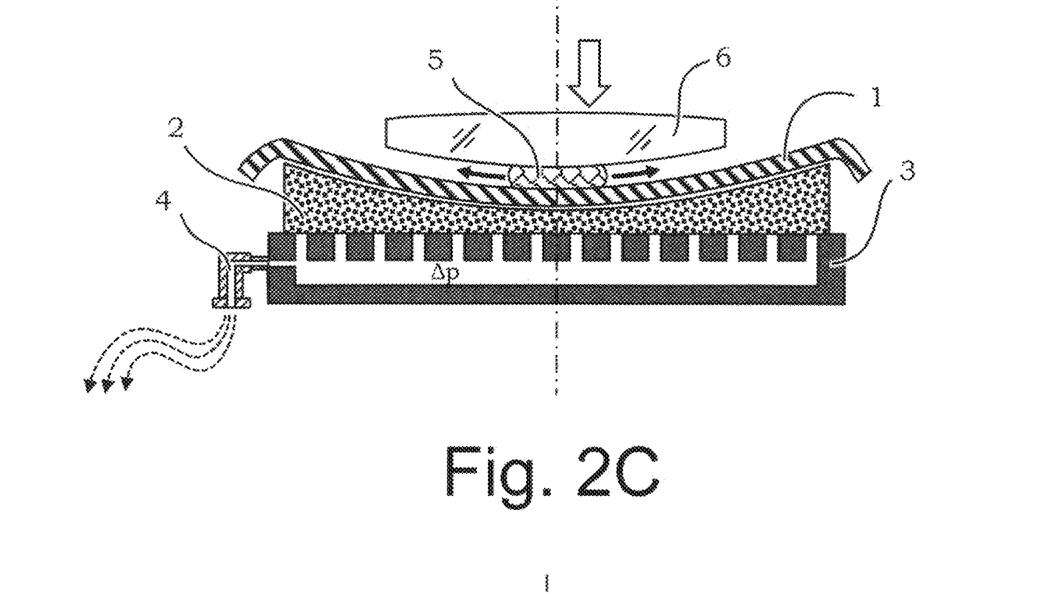

In the example of FIG. 2C, an optical lens element 6 is used as an example of a transparent carrier. In other embodiments, other carriers, in particular other transparent carriers, can also be used, for example curved panes for head-up displays (HUD), vehicle windows, vehicle fittings, displays and the like. Depending on the application, non-transparent carriers, for example for fittings in a motor vehicle, or reflective carriers, for example in the form of a parabolic mirror, can also be used. The lens element 6 can serve various purposes, for example as a spectacle lens or as a lens element in another optical apparatus.

In order to fasten the film 1 to the lens element 6, an adhesive, for example an optical cement, is applied to the film 1 and the lens element 6 is then pressed onto the film 1. The adhesive 5 preferably has a refractive index adapted to the film 1, such that unevennesses in the film 1 can still be compensated here. After the adhesive 5 has hardened or set, the film 1 is then fastened to the lens element 6. As can be seen, the surface of the layer 2 is complementary to that surface of the lens element 6 to which the film 1 is to be fastened, such that the film 1 has the correct shape for mounting on the lens element 6.

Due to the porosity of the layer 2, the film 1 can be shaped in particular without air inclusions. By mounting the film on the carrier, for example the lens element 6, in the state in which said film is suctioned and held in shape by the air bearing arrangement, the shape remains unchanged after the release (and hardening of the adhesive 5).

Next, in step 104, the carrier with the film mounted therein is removed from the air bearing arrangement. This can be effected in an automated manner by means of a gripper arm or manually. In some embodiments, this removal can be assisted in that the pump 15 operates as a pressure pump, and therefore an overpressure is generated which can make it easier to remove the carrier with the film mounted thereon from the air bearing arrangement.

Figure 2D:
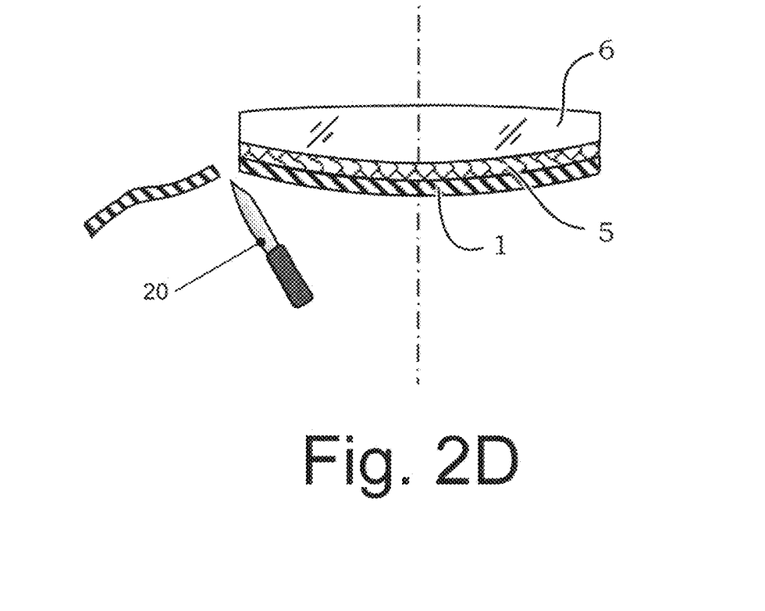

If necessary, excess film can then be removed in step 105. FIG. 2D shows, for illustration purposes, the lens element 6 which is removed from the air bearing arrangement and which has the film 1 mounted thereon by means of the adhesive 5. It should be pointed out that the diameters of film and adhesive are not to be regarded as being to scale. In particular, the layer of the adhesive 5 can have a smaller diameter than the film 1. Excess film, that is to say film which protrudes beyond the edge of the lens element 6, can be removed by means of a suitable cutting tool 20. This can also be effected in an automated manner.

Figure 2E:
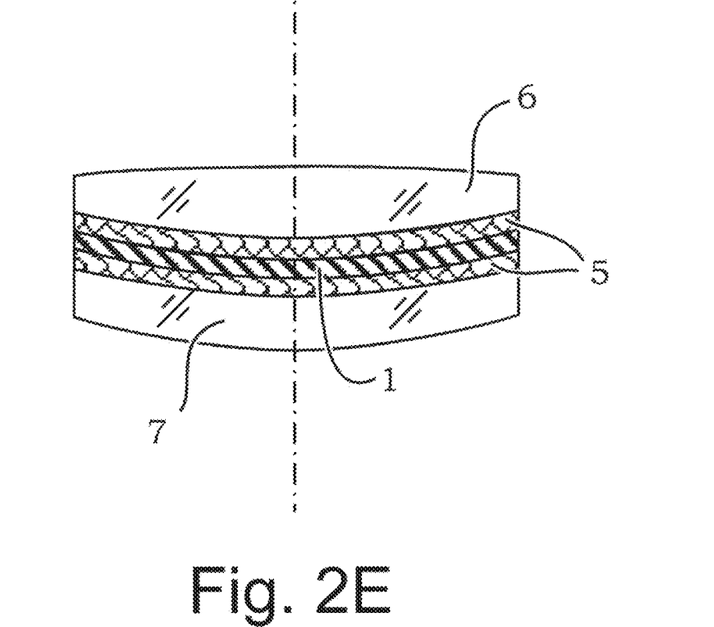

If the film is to be embedded in a component, for example in an optical component, a further carrier can be fastened to the film in step 106 of FIG. 1. An example is shown in FIG. 2E, where a further lens element 7, as an example of a further carrier, is fastened to the film 1, it again being possible to use a suitable adhesive 5, in particular the same adhesive as in step 103. In this way, an optical component can be produced in which the film 1 is embedded.

Figure 2F:
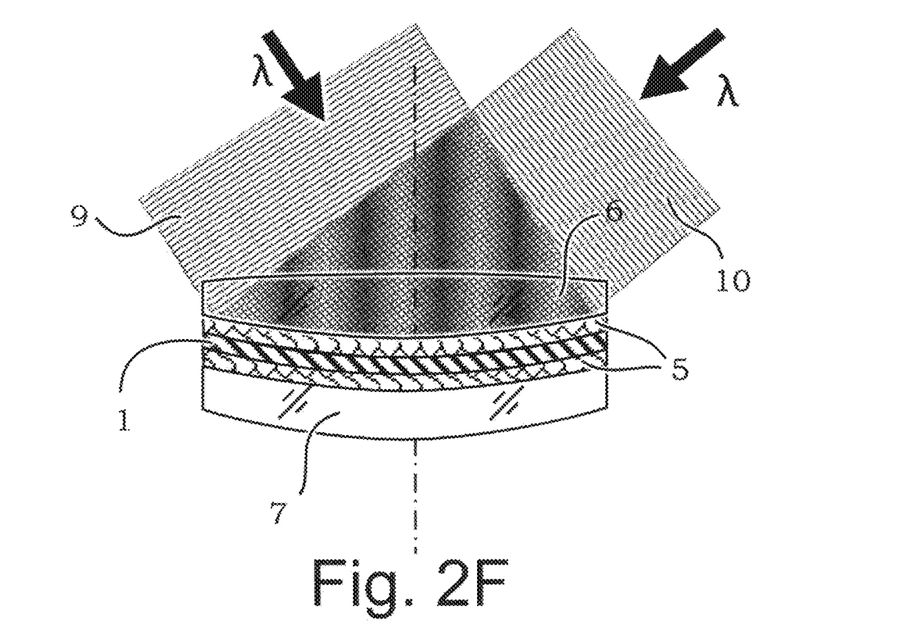

If the film 1 is a film made of a photosensitive material, for example for the production of a hologram, the film can then be exposed in step 107 in order to write grating structures or other holographic structures into the film. This is illustrated in FIG. 2F. Here, the film 1 is exposed to two wavefronts 9, 10 in order to generate a corresponding grating in the film 1, for example a volume hologram, by means of interference. One of the wavefronts 9, 10 can correspond to an object light and the other of the wavefronts 9, 10 to a reference light during the production of the hologram. Instead of such an exposure, other types of machining can also be carried out depending on the material of the film 1, for example engraving or laser writing.

Figure 3:
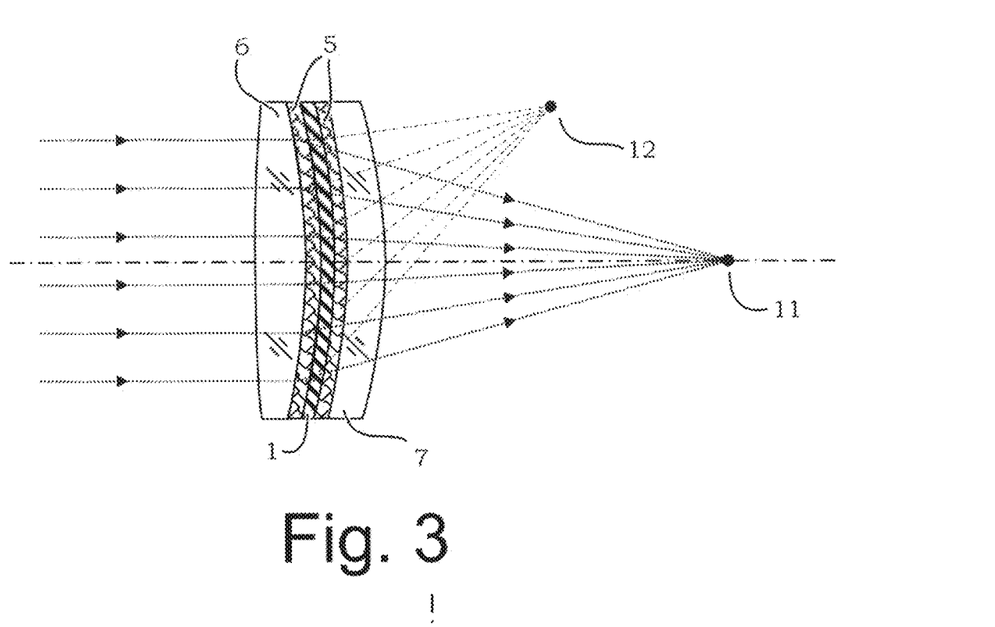
FIG. 3 shows an example of an optical component produced by means of the method of FIG. 1, FIGS. 4A and 4B show diagrams for illustration of a variation of the method of FIG. 1 when a liquid material is used, using one embodiment of the apparatus according to the invention.

An optical component that can be manufactured by the method described above is illustrated in FIG. 3. This consists of the already described lens elements 6, 7 with the film 1 embedded therein, a holographic structure having been written into the film. In this way, an apparatus with a refractive focus 11, which is produced by refraction at the lens elements 6, 7, and a diffractive focus 12, which results from the properties of the hologram, can be produced. However, this is only one example of an optical component that can be produced using embodiments.

Figure 4A:
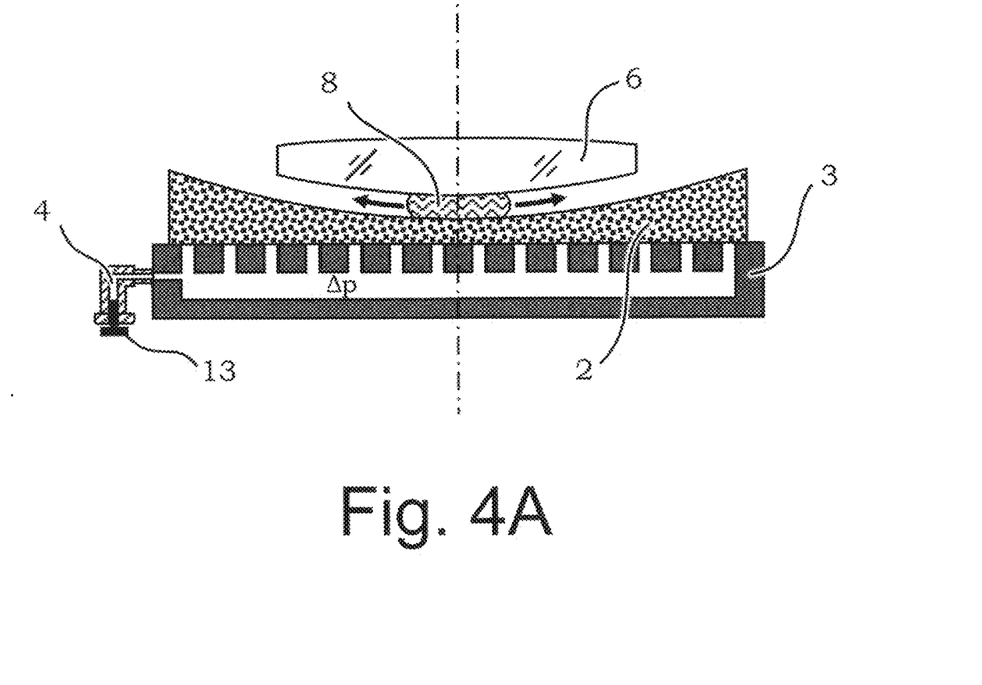
Figure 4B:
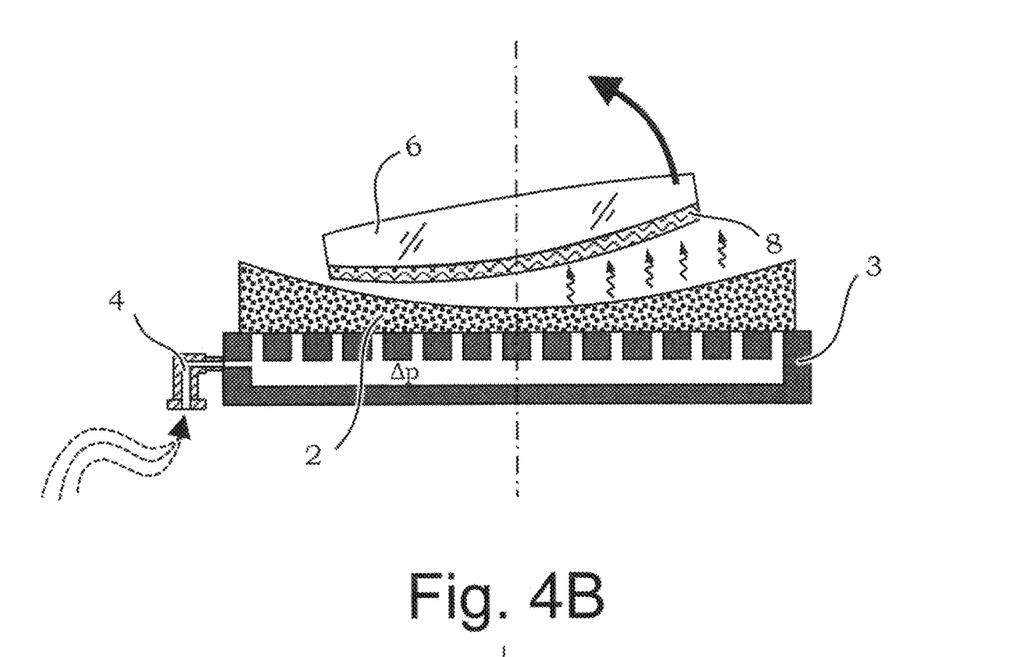

In addition to films, that is to say thin, pliable substrates, other materials can also be mounted on a carrier using variations of the method described. An example of this is illustrated in FIGS. 4A and 4B. Here, instead of a film, a liquid material 8 is applied to a carrier, here again the lens element 6 as an example. Examples of such material include photopolymers or OCA (Optically Clear Adhesive), which are in liquid form. A quantity of this material is applied to the porous layer 2. In this case, the air inlet/outlet is closed with a closure 13, possibly after the air bearing 3 has been set to a slight overpressure. This can prevent or at least reduce penetration of the liquid material 8 into the pores of the layer 2. When the lens element 6 is then pressed onto the layer 2, the liquid material 8 is distributed and adheres to the lens element 6.

Once the material 8 has hardened, which in some embodiments can be accelerated by supplying heat with a heater, as shown in FIG. 2B, the carrier with the material 8 is removed from the air bearing arrangement in accordance with step 104. Here, as shown in FIG. 4B, air is preferably supplied to the air bearing 3 in order to generate an overpressure and thus to be able to easily detach the lens element 6 with the material 8. The further processing can be carried out in the same way as for a film, that is to say, where necessary, a further carrier, for example the further lens element 7, can be fastened to a material 8, and/or the material 8 can be exposed or processed in some other way.

In the embodiments above, the material (for example the film) is machined, in particular exposed, after the carrier with the material has been removed from the air bearing arrangement. Machining, such as exposure, is, however, also possible at a different point in time in the production process. As an example, FIG. 5 shows an exposure of the film 1 to the wavefronts 9, 10 after the film 1 has been suctioned onto the layer 2 by the air bearing arrangement, that is to say following step 101 or 102 of FIG. 1. For this purpose, as mentioned, the surface of the porous layer 2 can have reflective properties, for example through a corresponding coating or machining such as polishing. Subsequently, as described, a carrier can then be mounted by means of an adhesive. Here, too, machining other than exposure is again possible.

In the embodiments above, a material to be applied to a carrier has been shaped by means of an air bearing 2, 3 and then fastened to a carrier, for example by means of the adhesive 5. In other embodiments, the carrier can additionally be shaped by means of a further air bearing. Additionally or alternatively, the material and the carrier can ultimately consist of the same material. A common embodiment for these two variations, which, however, can also be implemented independently of one another, will now be explained with reference to FIGS. 7 to 10.

Figure 7:
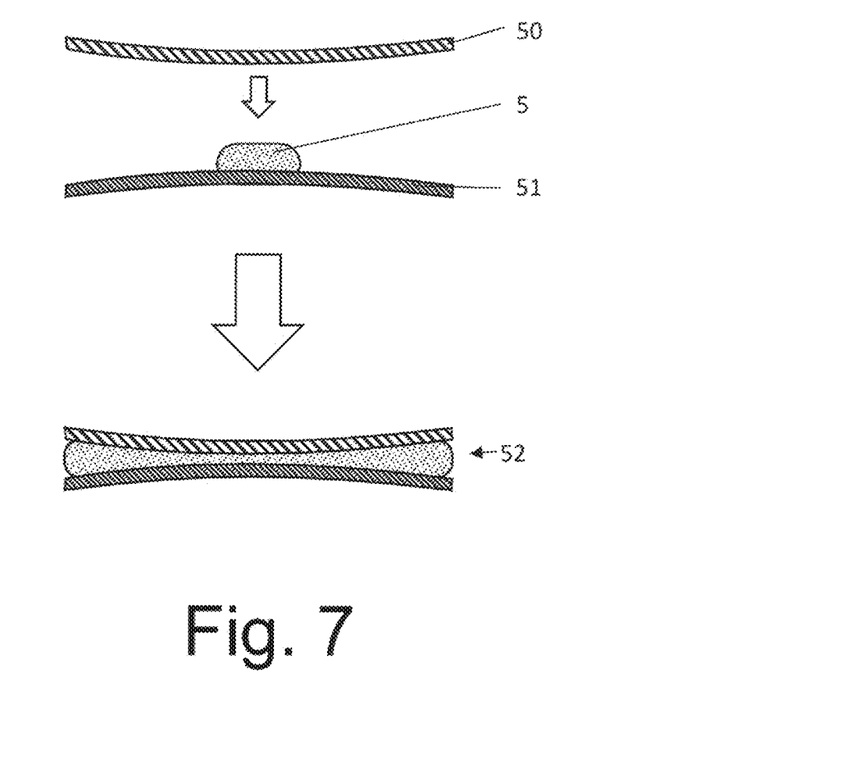
FIG. 7 shows a diagram for illustration of a problem that occurs when connecting two glass plates.

The task in this example is to adhesively bond two plates, in particular two transparent plates such as glass plates, to one another. To illustrate the problem, FIG. 7 shows a first glass plate 50 and a second glass plate 51, which are to be adhesively bonded by means of an adhesive 5. In this case, the glass plates 50, 51 have a relatively large area compared to their thickness. For example, the thickness can be in the range from less than 1 mm (for example films or protective glasses) to 10 mm substrate thickness, and an area with edge lengths in the range of 50 to 1000 mm. Larger dimensions (e.g. window panes, windshields) are also possible. In addition to glass plates, other such planar substrates can also be used, for example films and the like. Such glass plates 50, 51 normally have curvatures, as illustrated. If the glass plates 50, 51 are adhesively bonded to one another without further measures, an assembly 52 is produced which as a whole is not plane-parallel. If the assembly 52 is used for example for waveguide applications or beam expansion applications, this can result in imaging errors. In the case of a perpendicular passage of light, the assembly 52 has a focal length and can in this case have an undesirable imaging function.

One solution according to one embodiment consists in bringing both substrates 50, 51 into a desired shape, for example a planar shape, by means of corresponding air bearing arrangements, and then adhesively bonding them together. This will be explained with reference to FIGS. 8 to 10.

Figure 8:
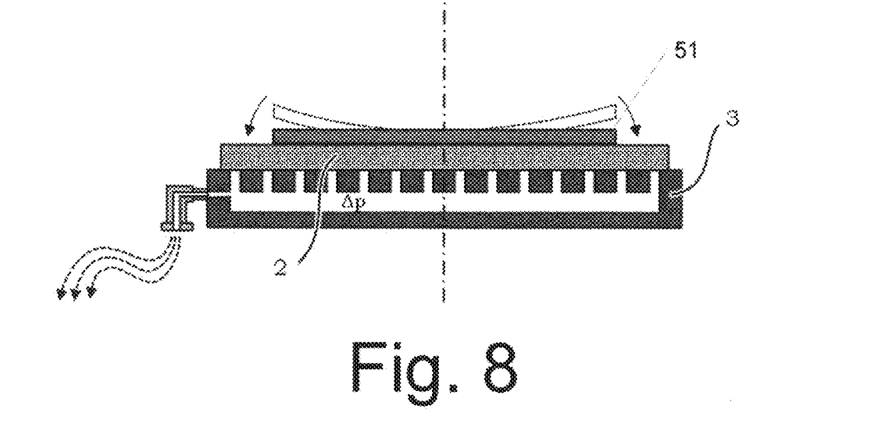
FIGS. 8 and 9 show diagrams for illustration of a method and an apparatus according to a further embodiment.
Figure 9:
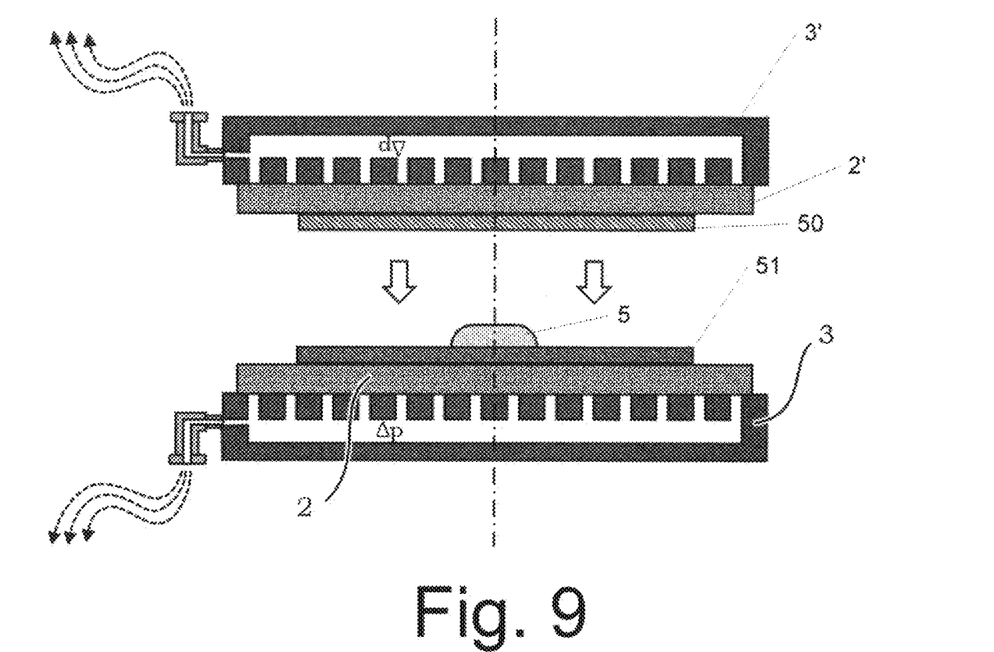

In FIG. 8, the second glass plate is brought into a planar shape on an air bearing arrangement 2, 3 by negative pressure, as described for the materials, for example the film 1, for the previous embodiments. The air bearing arrangement 2, 3 can be designed as described above; the above variations and details can also be applied here. In addition, as illustrated in FIG. 9, the first glass plate 50 is also brought into a desired shape, here a planar shape, by means of a further air bearing arrangement 2', 3'. The further air bearing arrangement 2', 3' used here can be designed like the air bearing arrangement 2, 3 already described. It can share a pump with it (for example the pump 15 already described) or it can have its own pump.

The two air bearing arrangements 2, 3 and 2', 3' are then brought together and the glass plates 50, 51 are adhesively bonded to one another by means of the adhesive 5. Thereafter, overpressure can optionally be applied to the air bearings 2, 3 and 2', 3', respectively, in order to release the glass plates 50, 51 from the air bearings.

Figure 10A:
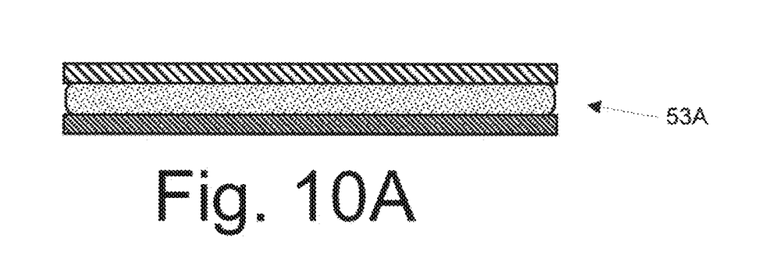
FIGS. 10A and 10B show examples of assemblies produced by means of the method and the apparatus of FIGS. 8 and 9.
Figure 10B:
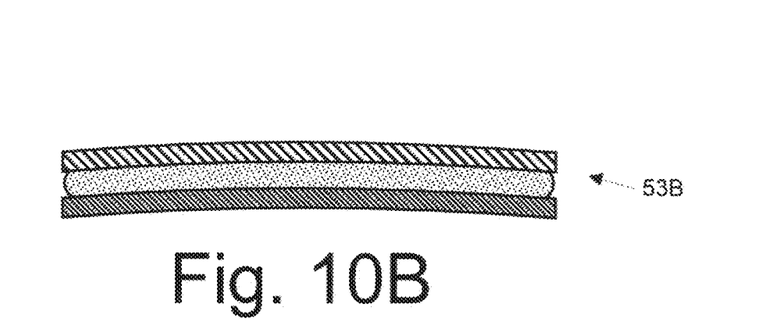

As shown in FIG. 10A, this results in an assembly 53A with constant thickness, which may be better suited for optical applications than the assembly 52 of FIG. 7. If a curvature occurs, in such cases this is then a common curvature of both groups as shown in an assembly 53B of FIG. 10B, which in many applications is less of a problem than a variable thickness as in the assembly 52 of FIG. 7. It should be noted that a curved assembly as shown in FIG. 10B can also be produced intentionally by the air bearing arrangements, in particular the porous layers 2, 2', having a corresponding shape.

Here, so to speak, the first glass plate 50 can be regarded as a carrier and the second glass plate 51 as a material to be applied to the carrier (or vice versa). It should be noted that in the example two similar elements (the glass plates 50, 51) are adhesively bonded to one another, but the procedure of FIGS. 8 to 10 can also be used to couple different elements to one another, for example to apply a large-area film to a large-area glass plate.

In the methods and apparatuses illustrated, the accuracy of the shaping of the material and/or of the carrier by means of the air bearing arrangements corresponds in this case substantially to the accuracy of the surfaces of the respective porous materials 2, 2'. As explained, this accuracy can be in the micrometer range.

As is thus apparent from the statements above, there are various variation possibilities.

The invention claimed is:

1. A method, comprising:
   placing a material on a surface of a porous layer of an air bearing arrangement, the surface of the porous layer being configured to be complementary to a surface of a carrier; and
   arranging the carrier on the material arranged on the surface of the porous layer,
   wherein the method further comprises at least one of the following:
      before arranging the carrier on the material, applying negative pressure to the air bearing arrangement to suction the material; and
      after arranging the carrier on the material, applying overpressure to the air bearing arrangement to release the carrier from the air bearing arrangement,
   wherein the method further comprises exposing the material to radiation to produce a holographic structure in the material and/or a grating structure in the material.

2. The method of claim 1, wherein the material comprises a film, and the method further comprises applying an adhesive to the film before arranging the carrier on the material.

3. The method of in claim 1, wherein the material comprises a liquid material.

4. The method of claim 3, further comprising closing an air connection of the air bearing arrangement when placing the material on the surface of the porous layer and when arranging the carrier.

5. The method of claim 1, further comprising heating the material on the surface of the porous layer.

6. The method of claim 1, wherein the material is mounted on the surface of the porous layer during exposure to the radiation.

7. The method of claim 1, wherein, during exposure to the radiation, the material is connected to the carrier, and the material is removed from the porous layer.

8. The method of claim 1, further comprising removing excess material from the carrier.

9. The method of claim 1, further comprising mounting a further carrier on the material on a side facing away from the carrier.

10. The method of claim 1, wherein the method is used to produce an optical component.

11. The method of claim 1, wherein the carrier and/or the material comprises a glass plate.

12. The method of claim 1, further comprising:
    placing the carrier on a surface of a further porous layer of a further air bearing arrangement, the surface of the further porous layer being configured to correspond to a desired surface of the carrier on which the material; and
    before the carrier is arranged on the material, applying negative pressure to the further air bearing arrangement to suction the carrier.

13. The method of claim 2, wherein the material comprises a liquid material.

14. The method of claim 2, further comprising heating the material on the surface of the porous layer.

15. The method of claim 2, further comprising treating the material.

16. The method of claim 2, further comprising removing excess material from the carrier.

17. The method of claim 2, further comprising mounting a further carrier on the material on a side facing away from the carrier.

18. The method of claim 2, wherein the method is used to produce an optical component.

19. The method of claim 1, wherein the material comprises a photosensitive material.

20. A method, comprising:
    placing a material on a surface of a porous layer of an air bearing arrangement, the surface of the porous layer being configured to be complementary to a surface of a carrier; and
    arranging the carrier on the material arranged on the surface of the porous layer,
    wherein the method further comprises at least one of the following:
       before arranging the carrier on the material, applying negative pressure to the air bearing arrangement to suction the material; and
       after arranging the carrier on the material, applying overpressure to the air bearing arrangement to release the carrier from the air bearing arrangement,
    wherein the method further comprises mounting a further carrier on the material on a side facing away from the carrier.

21. The method of claim 20, wherein the material comprises a film, and the method further comprises applying an adhesive to the film before arranging the carrier on the material.

22. A method, comprising:
    placing a material on a surface of a porous layer of an air bearing arrangement, the surface of the porous layer being configured to be complementary to a surface of a carrier; and
    arranging the carrier on the material arranged on the surface of the porous layer,
    wherein the method further comprises at least one of the following:
       before arranging the carrier on the material, applying negative pressure to the air bearing arrangement to suction the material; and
       after arranging the carrier on the material, applying overpressure to the air bearing arrangement to release the carrier from the air bearing arrangement,
    wherein the method further comprises:
       placing the carrier on a surface of a further porous layer of a further air bearing arrangement, the surface of the further porous layer being configured to correspond to a desired surface of the carrier on which the material; and
       before the carrier is arranged on the material, applying negative pressure to the further air bearing arrangement to suction the carrier.

23. A method, comprising:
    placing a material on a surface of a porous layer of an air bearing arrangement, the surface of the porous layer being configured to be complementary to a surface of a carrier; and
    arranging the carrier on the material arranged on the surface of the porous layer, wherein the method further comprises at least one of the following:
  before arranging the carrier on the material, applying negative pressure to the air bearing arrangement to suction the material; and
  after arranging the carrier on the material, applying overpressure to the air bearing arrangement to release the carrier from the air bearing arrangement,
wherein the material comprises a film, the method further comprises applying an adhesive to the film before arranging the carrier on the material, and the method is used to produce an optical component.

* * * * *

UNITED STATES PATENT AND TRADEMARK OFFICE
CERTIFICATE OF CORRECTION

PATENT NO. : 12,162,232 B2
APPLICATION NO. : 17/438294
DATED : December 10, 2024
INVENTOR(S) : Andreas Lütz et al.

It is certified that error appears in the above-identified patent and that said Letters Patent is hereby corrected as shown below:

In the Claims

Column 9, Line 34, Claim 3, delete "of in" and insert -- of --.

Signed and Sealed this
Eighteenth Day of February, 2025

Coke Morgan Stewart
*Acting Director of the United States Patent and Trademark Office*